United States Patent
Hermann et al.

(10) Patent No.: US 8,304,108 B2
(45) Date of Patent: *Nov. 6, 2012

(54) METHOD AND APPARATUS FOR MAINTAINING CELL WALL INTEGRITY USING A HIGH YIELD STRENGTH OUTER SLEEVE

(75) Inventors: Weston Arthur Hermann, Palo Alto, CA (US); Vineet Haresh Mehta, Mountain View, CA (US); Alex Prilutsky, San Mateo, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/777,148

(22) Filed: May 10, 2010

(65) Prior Publication Data

US 2011/0014506 A1  Jan. 20, 2011

Related U.S. Application Data

(63) Continuation-in-part of application No. 12/504,712, filed on Jul. 17, 2009, now Pat. No. 7,749,647.

(51) Int. Cl.
*H01M 2/02* (2006.01)

(52) U.S. Cl. ........ 429/177; 429/120; 429/148; 429/164; 429/176

(58) Field of Classification Search .......... 429/120, 429/148, 163, 164, 166, 168, 176, 177
See application file for complete search history.

(56) References Cited

U.S. PATENT DOCUMENTS

| 6,127,064 | A | 10/2000 | Shibata et al. |
| 6,146,785 | A | 11/2000 | Rigobert et al. |
| 6,413,666 | B1 * | 7/2002 | Oya .................. 429/53 |
| 6,706,446 | B2 | 3/2004 | Nakai et al. |
| 2007/0190407 | A1 * | 8/2007 | Fujikawa et al. ........ 429/130 |

FOREIGN PATENT DOCUMENTS

| EP | 807984 A1 | 11/1997 |
| JP | 2002298793 A | 10/2002 |

OTHER PUBLICATIONS

Berdichevsky et al., The Tesla Roadster Battery System, http://www.teslamotors.com/display_data/TeslaRoadsterBatterySystem.pdf, Aug. 16, 2006, pp. 1-5.

* cited by examiner

*Primary Examiner* — Gregg Cantelmo
(74) *Attorney, Agent, or Firm* — Patent Law Office of David G. Beck

(57) ABSTRACT

A method and apparatus is provided in which a pre-formed sleeve or pre-formed secondary can comprised of one or more layers of a high yield strength material is positioned around the pre-formed battery case, the pre-formed sleeve/secondary can inhibiting the flow of hot, pressurized gas from within the battery through perforations formed in the battery casing during a thermal runaway event.

19 Claims, 4 Drawing Sheets

METHOD AND APPARATUS FOR MAINTAINING CELL WALL INTEGRITY USING A HIGH YIELD STRENGTH OUTER SLEEVE

CROSS-REFERENCES TO RELATED APPLICATIONS

This application is a continuation-in-part of U.S. patent application Ser. No. 12/504,712, filed Jul. 17, 2009, now U.S. Pat. No. 7,749,647, issued Jul. 6, 2010, the disclosure of which is incorporated herein by reference for any and all purposes.

FIELD OF THE INVENTION

The present invention relates generally to batteries, and more particularly, to a means for maintaining cell wall integrity during thermal runaway.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven, or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway.

FIG. 1 is a simplified cross-sectional view of a conventional battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. Typically cell casing 101 is fabricated in such a way that the bottom surface 102 is integrated into the case, resulting in a seamless lower cell casing. The open end of cell case 101 is sealed by a cap assembly 105, assembly 105 including a battery terminal 107, e.g., the positive terminal, and an insulator 109, insulator 109 preventing terminal 107 from making electrical contact with case 101. Although not shown, a typical cap assembly will also include an internal positive temperature coefficient (PTC) current limiting device, a current interrupt device (CID), and a venting mechanism, the venting mechanism designed to rupture at high pressures and provide a pathway for cell contents to escape. Additionally, cap assembly 105 may contain other seals and elements depending upon the selected design/configuration.

Electrode assembly 103 is comprised of an anode sheet, a cathode sheet and an interposed separator, wound together in a spiral pattern often referred to as a jellyroll'. An anode electrode tab 111 connects the anode electrode of the wound electrode assembly to the negative terminal while a cathode tab 113 connects the cathode electrode of the wound electrode assembly to the positive terminal. In the illustrated embodiment, the negative terminal is case 101 and the positive terminal is terminal 107. In most configurations, battery 100 also includes a pair of insulators 115/117. Case 101 includes a crimped portion 119 that is designed to help hold the internal elements, e.g., seals, electrode assembly, etc., in place.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range.

While the venting element of a cell may prevent excessive internal pressure, this element may have little effect on the thermal aspects of a thermal runaway event. For example, if a local hot spot occurs in cell 100 at a location 121, the thermal energy released at this spot may be sufficient to heat the adjacent area 123 of the single layer casing wall 101 to above its melting point. Even if the temperature of area 123 is not increased beyond its melting point, the temperature of area 123 in concert with the increased internal cell pressure may quickly lead to the casing wall being perforated at this location. Once perforated, the elevated internal cell pressure will cause additional hot gas to be directed to this location, further compromising the cell at this and adjoining locations.

It should be noted that when a cell undergoes thermal runaway and vents in a controlled fashion using the intended venting element, the cell wall may still perforate due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

As previously noted, cell perforations are due to localized, transient hot spots where hot, pressurized gas from a concentrated thermal event is flowing near the inner surface of the cell. Whether or not a cell transient hot spot perforates the cell wall or simply dissipates and leaves the cell casing intact depends on a number of factors. These factors can be divided into two groups; those that are based on the characteristics of the thermal event and those that are based on the physical qualities of the cell casing. Factors within the first group include the size and temperature of the hot spot as well as the duration of the thermal event and the amount of gas generated by the event. Factors within the second group include the wall thickness as well as the casing's yield strength as a function of temperature, heat capacity and thermal conductivity.

FIG. 2 illustrates one conventional approach to improving the failure resistance of a cell, where failure is defined as a thermally induced wall perforation. As shown, in cell 200 the thickness of casing 201 has been significantly increased, thereby improving the cell's failure resistance at the expense of cell weight.

U.S. Pat. No. 6,127,064 discloses an alternate approach to the design of a cell casing. This patent proposes to provide a lightweight, high rigidity cell casing that can suppress case deformation, the disclosed cell casing being formed by deep-drawing a clad material. Preferably the clad material is formed by diffusion-bonding an aluminum sheet and an iron sheet together, the aluminum sheet providing low weight and the iron sheet providing high rigidity. In at least one embodiment, the clad material used during the deep-drawing fabrication step also includes a layer of nickel on the inner surface of the iron sheet and a second layer of nickel on the outer surface of the iron sheet and interposed between the iron and aluminum sheets, the nickel layers providing corrosion resistance.

While the techniques described above and known in the prior art may be used to achieve high strength battery casings, in general these techniques require substantial wall thicknesses, and thus undue weight, in order to achieve the desired wall strength. Additionally, although these techniques improve wall strength and rigidity, they do not necessarily improve the thermal behavior of the wall during a thermal event (e.g., thermal runaway). Accordingly, what is needed is a cell design that can help maintain cell wall integrity during a thermal event through a combination of high strength and improved thermal behavior. The present invention provides such a cell design

SUMMARY OF THE INVENTION

The present invention provides a method and apparatus for inhibiting the flow of hot, pressurized gas from within a battery through perforations formed in the battery casing during a thermal runaway event.

In at least one embodiment of the invention, a battery assembly is provided comprised of a battery and a pre-formed sleeve positioned around the pre-formed battery cell case, the pre-formed sleeve inhibiting the escape of hot, pressurized gas from within the battery through a perforation formed in the outer surface of the battery cell case during a thermal runaway event. The pre-formed sleeve may be comprised of a single layer of a high yield strength material; may be comprised of a single layer of a material with a yield strength of at least 250 MPa; may be comprised of a single layer of a material with a yield strength of at least 250 MPa at a temperature of 1000° C.; and/or may be comprised of a single layer of a material with a yield strength of at least 500 MPa. The pre-formed sleeve may be comprised of a plurality of layers, wherein each of the plurality of layers is comprised of a high yield strength material; wherein each of the plurality of layers is comprised of a material with a yield strength of at least 250 MPa; wherein each of the plurality of layers is comprised of a material with a yield strength of at least 250 MPa at a temperature of 1000° C.; and/or wherein each of the plurality of layers is comprised of a material with a yield strength of at least 500 MPa. The pre-formed sleeve may be comprised of a plurality of layers of at least two different high yield strength materials, wherein each of the at least two different high yield strength materials has a yield strength of at least 250 MPa; wherein each of the at least two different high yield strength materials has a yield strength of at least 250 MPa at a temperature of 1000° C.; and/or wherein each of the at least two different high yield strength materials has a yield strength of at least 500 MPa. Exemplary high yield strength materials include engineering steels, high strength structural steels, plated steel, stainless steel, titanium, titanium alloys, and nickel alloys.

In at least one embodiment of the invention, a battery assembly is provided comprised of a battery and a pre-formed secondary can positioned around the pre-formed battery cell case, the pre-formed secondary can inhibiting the escape of hot, pressurized gas from within the battery through a perforation formed in the outer surface of the battery cell case during a thermal runaway event. The pre-formed secondary can may be comprised of a single layer of a high yield strength material; may be comprised of a single layer of a material with a yield strength of at least 250 MPa; may be comprised of a single layer of a material with a yield strength of at least 250 MPa at a temperature of 1000° C.; and/or may be comprised of a single layer of a material with a yield strength of at least 500 MPa. The pre-formed secondary can may be comprised of a plurality of layers, wherein each of the plurality of layers is comprised of a high yield strength material; wherein each of the plurality of layers is comprised of a material with a yield strength of at least 250 MPa; wherein each of the plurality of layers is comprised of a material with a yield strength of at least 250 MPa at a temperature of 1000° C.; and/or wherein each of the plurality of layers is comprised of a material with a yield strength of at least 500 MPa. The pre-formed secondary can may be comprised of a plurality of layers of at least two different high yield strength materials, wherein each of the at least two different high yield strength materials has a yield strength of at least 250 MPa; wherein each of the at least two different high yield strength materials has a yield strength of at least 250 MPa at a temperature of 1000° C.; and/or wherein each of the at least two different high yield strength materials has a yield strength of at least 500 MPa. Exemplary high yield strength materials include engineering steels, high strength structural steels, plated steel, stainless steel, titanium, titanium alloys, and nickel alloys.

In at least one embodiment of the invention, a method of inhibiting the flow of hot, pressurized gas from within a battery through a perforation formed in an outer surface of the battery case during a thermal runaway event is provided, the method comprising the step of fitting a pre-formed sleeve around the outer surface of the battery case after formation of the battery case, the method further comprising the step of selecting a high yield strength material for the pre-formed sleeve, where the high yield strength material has a yield strength of at least 250 MPa, and where the fitting step is performed after formation of the battery case and prior to the thermal runaway event. Further, the fitting step may be performed after assembly of the battery.

In at least one embodiment of the invention, a method of inhibiting the flow of hot, pressurized gas from within a battery through a perforation formed in an outer surface of the battery case during a thermal runaway event is provided, the method comprising the step of fitting a pre-formed secondary can around the outer surface of the battery case after formation of the battery case, the method further comprising the step of selecting a high yield strength material for the pre-formed secondary can, where the high yield strength material has a yield strength of at least 250 MPa, and where the fitting step is performed after formation of the battery case and prior to the thermal runaway event. Further, the fitting step may be performed after assembly of the battery.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "assembled battery" and "assembled cell" may be used interchangeably and refer to a cell that has completed the fabrication and assembly steps to form an electrically functioning cell. The terms "fabricated cell casing" and "formed cell casing" may be used interchangeably and refer to a cell casing that has completed the formation/fabrication steps and is ready for inclusion of the inner battery components (e.g., electrodes, electrolyte, spacers, cap assembly, etc.). It should be understood that identical element symbols used on multiple figures refer to the same component, or components of equal functionality. Additionally, the accompanying figures are only meant to illustrate, not limit, the scope of the invention and should not be considered to be to scale.

Throughout the following specification, the invention is described relative to cells using the 18650 form-factor. It should be understood, however, that the invention may also be applied to other cell designs, shapes, chemistries, form-factors and configurations while retaining the functionality of the present invention. For example, the application is equally applicable to prismatic and pouch cells.

The present inventors recognize the weight constraints placed on the batteries within a large battery pack and the factors that contribute to the initiation and growth of wall perforations during thermal runaway. Additionally, the present inventors recognize that once a cell enters into thermal runaway it is no longer viable, and therefore at this point the primary purpose of the cell casing is to control the direction and pathway for the hot, escaping gas generated by the thermal runaway event. In recognition of these design parameters, the intent of the present invention is to minimize, if not altogether eliminate, the escape of hot, pressurized gas from the sides of a cell where the escaping gas can adversely affect neighboring cells. Rather than allow the hot gas to escape through wall perforations, the present invention forces this gas to exit the cell from either end surface, or in some embodiments, from only one of the cell end surfaces.

Figure 1:
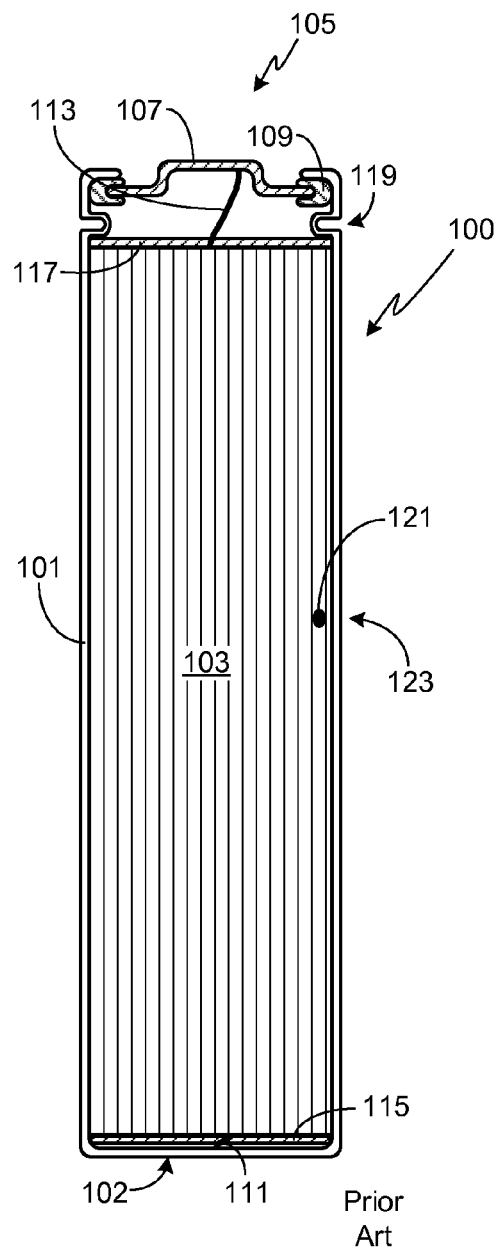
FIG. 1 is a simplified cross-sectional illustration of a cell utilizing the 18650 form-factor.
Figure 2:
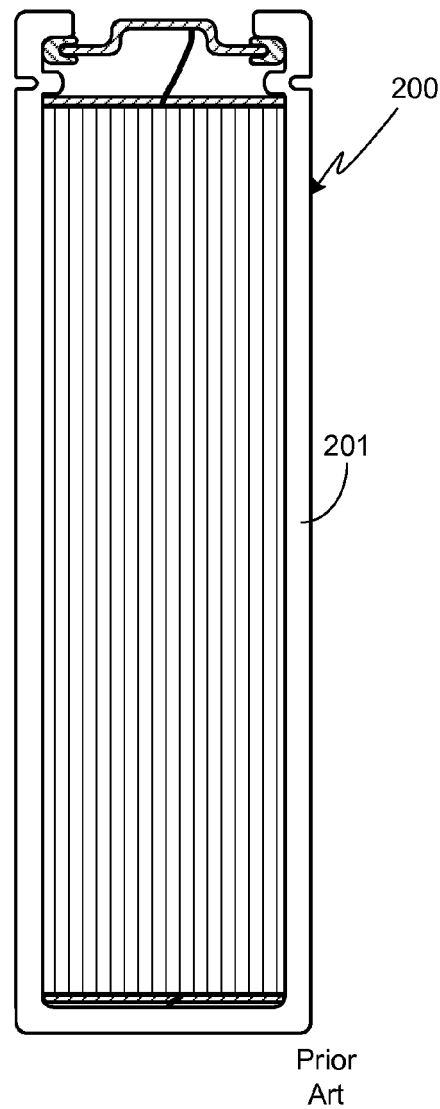
FIG. 2 illustrates the cell shown in FIG. 1, modified to increase failure resistance in accordance with a prior art approach.
Figure 3:
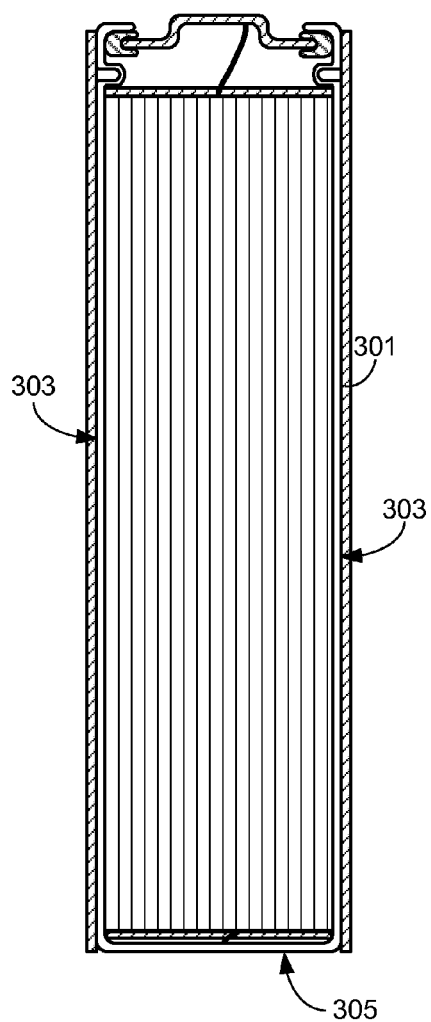
FIG. 3 illustrates a preferred embodiment of the invention utilizing a high yield strength sleeve.
Figure 4:
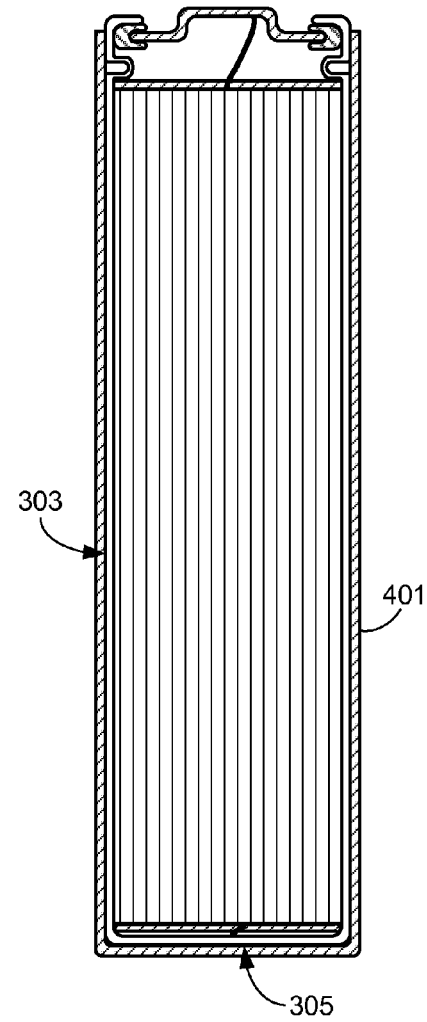
FIG. 4 illustrates a preferred embodiment of the invention utilizing a high yield strength secondary can.

FIG. 3 illustrates a first preferred embodiment of the invention. In this embodiment, a conventional cell such as that shown in FIG. 1 is modified by positioning a pre-formed sleeve 301 lengthwise over the outer casing wall 101. Preferably pre-formed sleeve 301 is added after assembly of the cell has been completed, but prior to the inclusion of the cell within the cell's intended application, e.g., a battery pack. Alternately, pre-formed sleeve 301 may be added after fabrication of the cell casing and in a separate fabrication step, but prior to cell assembly. As shown, in this embodiment sleeve 301 only covers the sidewalls 303 of the cell case, not the bottom surface 305 of the casing. FIG. 4 illustrates a modification of this embodiment in which a pre-formed secondary can 401 is positioned lengthwise over the cell casing, thereby covering both sidewalls 303 and bottom cell surface 305. As in the embodiment illustrated in FIG. 3, pre-formed secondary can 401 is either added after the cell has been assembled, or after the formation/fabrication of the cell casing 101 but prior to battery assembly.

Regardless of whether a sleeve is added to the cell as shown in FIG. 3, or a secondary can is added to the cell has shown in FIG. 4, preferably there is minimal clearance between the inner surface of sleeve 301 or inner surfaces of the can 401 and the outer surface(s) of the cell casing. In at least one embodiment, the sleeve or secondary can is press-fit or force-fit onto the cell casing, for example using a hydraulic press-fit system.

The inventors have found that during a thermal runaway event, the behavior of a cell with a sleeve or secondary can as shown in FIGS. 3 and 4 is quite different from a conventional cell, even if the conventional cell is fabricated from a material that has the same composition and thickness as a cell fabricated in accordance with the invention. The differences in behavior are largely due to the thermal contact resistance that occurs between the sleeve and cell casing of the assembled cell, or the secondary can and the cell casing of the assembled cell. For example, the thermal resistance of an 18650 cell with a single stainless steel wall of thickness 0.13 millimeters is $8.156 \times 10^{-6}$ C m$^2$/W. In contrast, the thermal resistance of an 18650 cell with a dual stainless steel wall in which the two walls have a combined thickness of 0.13 millimeters and in which the outer wall is in the form of a pre-formed sleeve added after cell assembly is $2.082 \times 10^{-4}$ C m$^2$/W. Accordingly, with all other factors being the same, adding a sleeve increases the thermal resistance by a factor of approximately 25. As a result, for this configuration a cell with an internal temperature of 1700 K will transfer only about 60 watts of thermal energy via conduction in contrast to over 1500 watts for the non-sleeved, conventional configuration.

The conventional wisdom regarding the design of battery casings has been to change the composition and/or thickness of the casing during case fabrication in order to achieve the desired cell properties, properties such as wall strength, corrosion resistance, lower weight, etc. While these goals may be achieved through case design, the present inventors have found that these improvements do not adequately achieve the goals of the present invention, i.e., increasing the resistance of the cell casing to perforation during a thermal event as well as increasing the resistance to propagation of the thermal event to adjacent cells.

The use of a separate sleeve/secondary can offers a number of advantages over the conventional approach of simply increasing the wall thickness of casing 101 and/or fabricating the wall from multiple layers of various materials. First and foremost, the goals of significantly decreasing the risk of hot, pressurized gas escaping through the cell wall and redirecting this escaping gas to the cell ends are both achieved while adding much less weight to the cell than would be required to achieve the same performance using the conventional approach. Second, as sleeve 301 (or can 401) is added after completion of cell assembly, or at least added after cell case fabrication, this approach can be used with virtually any manufacturer's cell since it does not affect the cell manufacturing process. Third, while the material selected for casing 101 must be non-reactive with the cell contents (e.g., electrolyte and electrode assembly), no such material constraints are placed on sleeve 301 or can 401. Accordingly the material used for sleeve 301, or can 401, can be selected based on its ability to minimize or eliminate the escape of hot, pressurized gas from the cell sidewalls.

Preferably the failure resistance of sleeve 301, or can 401, is further enhanced by fabricating the sleeve from a material that exhibits high yield strength at high temperature. Preferably the yield strength of sleeve 301, or can 401, is at least 250 MPa at room temperature, more preferably at least 250 MPa at a temperature of 1000° C., still more preferably at least 500 MPa at room temperature, and yet still more preferably at least 500 MPa at a temperature of 1000° C.

Given the thermal contact resistance between the case and the sleeve or can as noted above, and given that the sleeve/can is preferably constructed of a high yield strength material, typically only casing 101 will be perforated during thermal runaway, leaving outer sleeve 301 (or can 401) intact. As a result, adjacent cells are not subjected to a stream of high temperature, pressurized gas. Additionally, in this situation, and given the minimal clearance between the outer surface of case 101 and the inner surface of either sleeve 301 or can 401, sleeve 301 or can 401 will prevent the rapid growth of the case wall perforation, thereby minimizing the amount of gas that escapes through the case wall perforation. This effect is aided by the cell case dimensions expanding slightly during thermal runaway due to the increased internal pressure, thereby further improving the contact between the outer cell surface and the interior surface of the sleeve or can. Accordingly little, if any, hot gas escapes through the case wall perforation and that which does escape is redirected by sleeve 301 to either cell end, or by can 401 to the upper cell end, where its effects on neighboring cells are minimized. Preventing the flow of high temperature, pressurized gas from the affected cell combined with the substantially decreased heat conduction from the sleeved cell leads to substantial reduction in thermal energy being transferred from the cell undergoing thermal runaway to adjacent cells, thereby decreasing the chances of a single thermal event propagating throughout the battery pack.

It will be appreciated that there are a variety of materials suitable for use in constructing sleeve 301 or can 401. Exemplary materials include various engineering and high strength structural steels, plated steel, stainless steel, titanium and titanium alloys, and nickel alloys. The preferred technique or techniques for fabricating sleeve 301/can 401 depend on the selected material as well as the shape of the cell for which the sleeve or can is to be used. For example, if the cell has the 18650 form-factor, the sleeve/can is cylindrically shaped. Sleeve 301 and can 401 may be fabricated using any of a variety of techniques including, but not limited to, (i) drawing the sleeve, (ii) wrapping a strip or sheet of the desired material around the cell and welding or mechanically coupling the edges together, (iii) bending and welding a strip or sheet of the desired material into the desired shape, or (iv) bending a strip or sheet of the desired material into the desired shape and coupling the two edges together using mechanical interconnects. The sleeve or can may be bonded into place.

Figure 5:
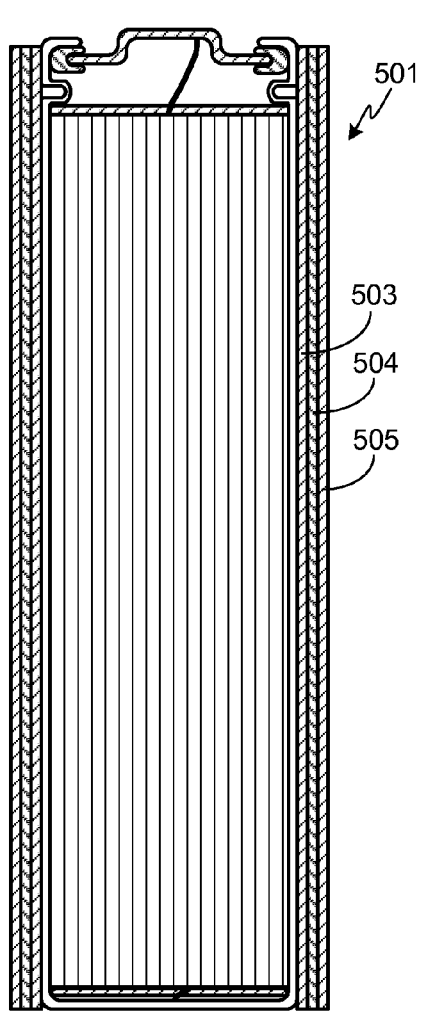
FIG. 5 illustrates a modification of the embodiment shown in FIG. 3, the modified configuration utilizing a multi-layer sleeve.
Figure 6:
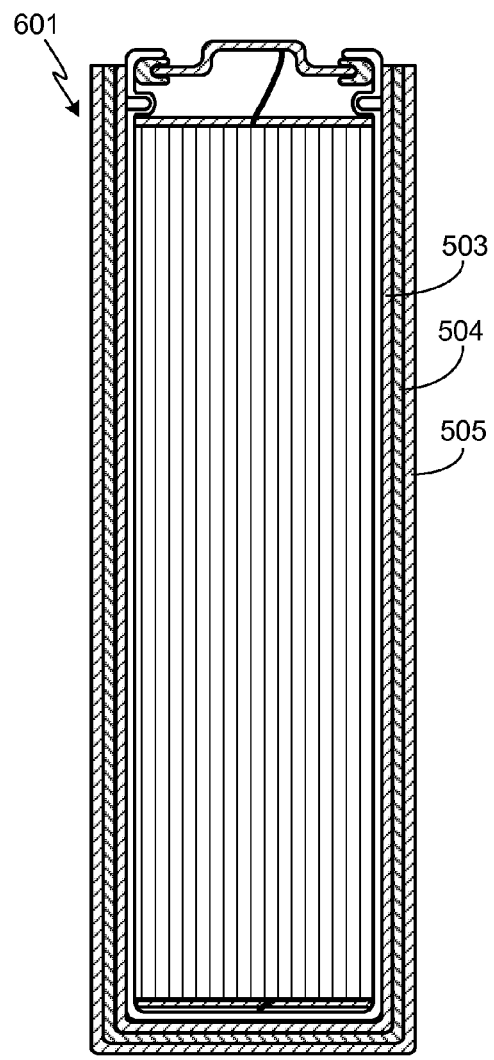
FIG. 6 illustrates a modification of the embodiment shown in FIG. 4, the modified configuration utilizing a multi-layer secondary can.

FIGS. 5 and 6 illustrate a modification of the embodiments shown in FIGS. 3 and 4, respectively, in which the sleeve 501 or can 601 is fabricated from a plurality of layers 503-505. Preferably three layers are used, as shown, although it will be appreciated that either a fewer number or a greater number of layers may be used in these embodiments. Preferably all of the layers are comprised of a material exhibiting high yield strength at high temperatures, more specifically a yield strength of at least 250 MPa at room temperature, still more preferably at least 250 MPa at a temperature of 1000° C., still more preferably at least 500 MPa at room temperature, and yet still more preferably at least 500 MPa at a temperature of 1000° C. The plurality of layers may be comprised of the same material, or of one or more different materials. Exemplary materials include various engineering and high strength structural steels, plated steel, stainless steel, titanium and titanium alloys, and nickel alloys.

Figures 7, 8:
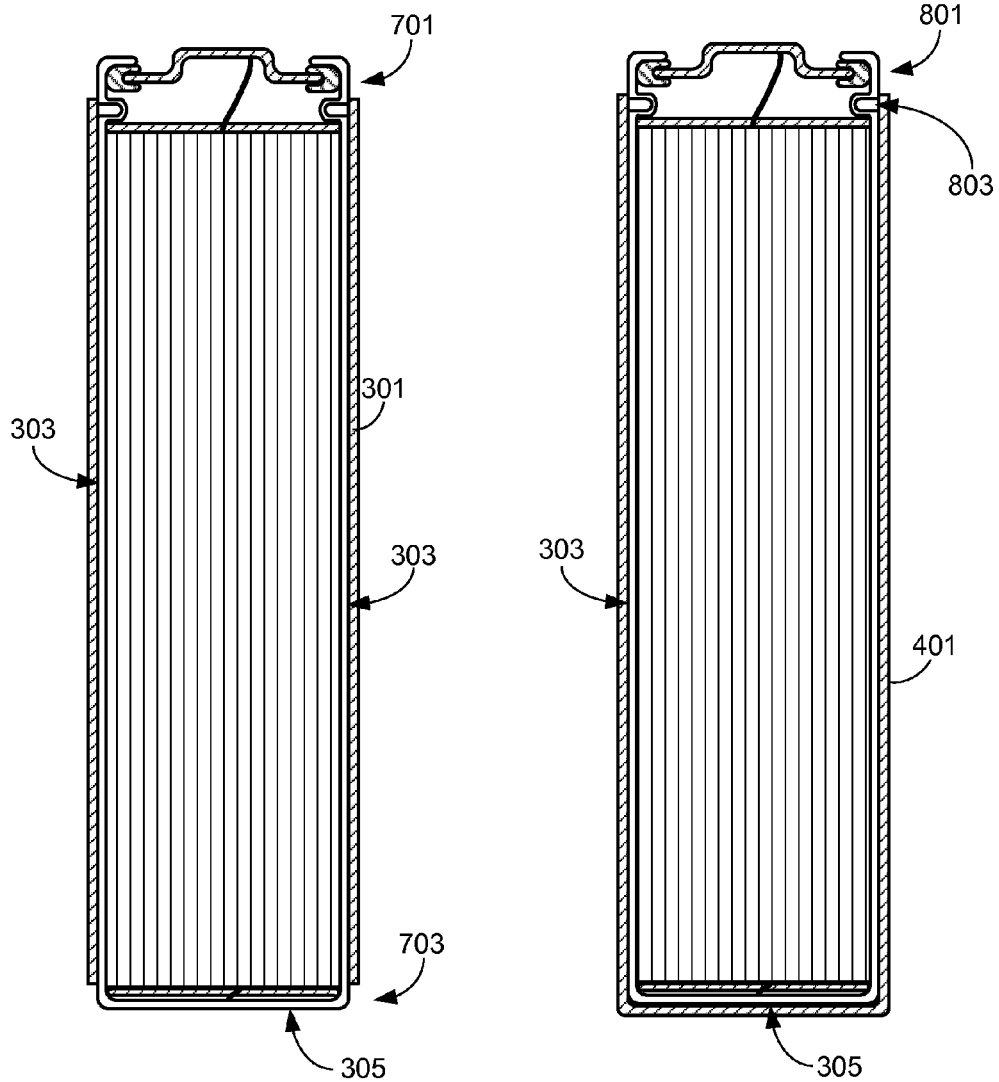
FIG. 7 illustrates a modification of the embodiment shown in FIG. 3, the modified configuration including upper and lower electrical contact regions.
FIG. 8 illustrates a modification of the embodiment shown in FIG. 4, the modified configuration including an upper electrical contact region.

In the embodiments illustrated in FIGS. 3 and 5 that utilize a sleeve, typically electrical contact is made to the cell casing, assuming that the cell casing is one of the cell's terminals as in an 18650 form-factor cell, at the bottom, exposed surface 305. Alternately, assuming that the material(s) comprising the sleeve is electrically conductive and that there is no electrical insulator (e.g., a bonding material) interposed between the outer cell sidewall and the sleeve, contact may be made through the sleeve. Alternately, and as illustrated in the exemplary embodiment shown in FIG. 7, an upper region 701 and/or a lower region 703 of cell sidewall 303 may be left uncovered by sleeve 301 (or sleeve 501), thus allowing electrical contact to be made to the cell via this region or regions. Preferably region 701 and/or region 703 is in the form of a ring that extends around the circumference of the cell case as shown with a width, measured from the respective end of the cell casing, of less than 5 millimeters, more preferably between 2 and 4 millimeters, and still more preferably between 2 and 3 millimeters.

In the embodiments illustrated in FIGS. 4 and 6 that utilize a secondary can, electrical contact may be made to the cell casing through the secondary can, assuming that the material(s) comprising the secondary can is electrically conductive and that there is no electrical insulator (e.g., a bonding material) interposed between the outer cell casing and the inside surface of the can. Alternately, and as illustrated in the exemplary embodiment shown in FIG. 8, an upper region 801 of cell sidewall 303 is left uncovered by the can, thus allowing electrical contact to be made to the cell via this region. Preferably region 801 is in the form of a ring that extends around the circumference of the cell case as shown with a width, measured from the top of the cell casing, of less than 5 millimeters, more preferably between 2 and 4 millimeters, and still more preferably between 2 and 3 millimeters. Preferably region 801 is located above crimp 803 as the region above crimp 803 is less susceptible to the formation of hot spots as it lies above electrode assembly 103.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery assembly, comprising:
  a battery, said battery comprising:
    a pre-formed cell case having an exterior sidewall surface, a first end portion and a second end portion, wherein said first end portion is comprised of a cell case bottom, and wherein said second end portion is comprised of a cap assembly retention lip and a central open portion;
    an electrode assembly contained within said pre-formed cell case, wherein a first electrode of said electrode assembly is electrically connected to said pre-formed cell case; and
    a cap assembly mounted to said pre-formed cell case, said cap assembly closing said central open portion of said second end portion, wherein said cap assembly further comprises a battery terminal electrically isolated from said pre-formed cell case and electrically connected to a second electrode of said electrode assembly; and
  a pre-formed sleeve positioned around and in contact with said pre-formed cell case, wherein said pre-formed sleeve is formed separately from said pre-formed cell case, wherein an interior surface of said pre-formed sleeve is proximate to said exterior sidewall surface of said pre-formed cell case, wherein a case contact region of said exterior sidewall surface of said pre-formed cell case remains uncovered by said pre-formed sleeve, wherein said case contact region is proximate to an end surface of said pre-formed cell case, wherein said pre-formed sleeve is comprised of a high yield strength material, wherein said pre-formed sleeve inhibits the escape of hot, pressurized gas from within said battery through said exterior sidewall surface of said cell case during a thermal runaway event, and wherein said pre-formed sleeve directs the flow of said hot, pressurized gas towards said first end portion or said second end portion.

2. The battery assembly of claim 1, wherein said battery is pre-assembled prior to positioning said pre-formed sleeve around said pre-formed cell case.

3. The battery assembly of claim 1, wherein said pre-formed sleeve is press-fit around said pre-formed cell case.

4. The battery assembly of claim 1, wherein said battery has an 18650 form-factor.

5. The battery assembly of claim 1, wherein said high yield strength material is selected from the group of materials consisting of steels, plated steel, stainless steel, titanium, titanium alloys, and nickel alloys.

6. The battery assembly of claim 1, wherein said pre-formed sleeve is comprised of a single layer of said high yield strength material.

7. The battery assembly of claim 6, wherein said high yield strength material has a yield strength of at least 250 MPa.

8. The battery assembly of claim 6, wherein said high yield strength material has a yield strength of at least 250 MPa at a temperature of 1000° C.

9. The battery assembly of claim 6, wherein said high yield strength material has a yield strength of at least 500 MPa.

10. The battery assembly of claim 1, wherein said pre-formed sleeve is comprised of a plurality of layers, wherein each of said plurality of layers is comprised of said high yield strength material.

11. The battery assembly of claim 10, wherein said high yield strength material has a yield strength of at least 250 MPa.

12. The battery assembly of claim 10, wherein said high yield strength material has a yield strength of at least 250 MPa at a temperature of 1000° C.

13. The battery assembly of claim 10, wherein said high yield strength material has a yield strength of at least 500 MPa.

14. The battery assembly of claim 1, wherein said pre-formed sleeve is comprised of a plurality of layers, wherein said plurality of layers are comprised of at least two different high yield strength materials.

15. The battery assembly of claim 14, wherein each of said at least two different high yield strength materials has a yield strength of at least 250 MPa.

16. The battery assembly of claim 14, wherein each of said at least two different high yield strength materials has a yield strength of at least 250 MPa at a temperature of 1000° C.

17. The battery assembly of claim 14, wherein each of said at least two different high yield strength materials has a yield strength of at least 500 MPa.

18. The battery assembly of claim 1, wherein said case contact region is proximate to said end surface of said second end portion of said pre-formed cell case.

19. The battery assembly of claim 1, wherein said case contact region is proximate to said end surface of said first end portion of said pre-formed cell case.

* * * * *